United States Patent
Bouldin et al.

(10) Patent No.: US 9,292,261 B1
(45) Date of Patent: Mar. 22, 2016

(54) REVISION MANAGEMENT TOOLS FOR A MULTI-USER CAX ENVIRONMENT

(71) Applicant: United Technologies Corporation, Hartford, CT (US)

(72) Inventors: Lee Edward Bouldin, Woodbridge, CT (US); Edward A. Krystowski, Granby, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/623,174

(22) Filed: Feb. 16, 2015

(51) Int. Cl.
*G06F 9/44* (2006.01)

(52) U.S. Cl.
CPC .................................... *G06F 8/20* (2013.01)

(58) Field of Classification Search
CPC .......................................................... G06F 8/20
USPC ................................................ 717/101–123
See application file for complete search history.

(56) References Cited

U.S. PATENT DOCUMENTS

| 8,229,715 | B1 | 7/2012 | Teller et al. |
| 2006/0212487 | A1* | 9/2006 | Kennis ............... G06F 17/30569 |
| 2011/0161376 | A1* | 6/2011 | Dickson .............. G06F 17/2288 707/803 |
| 2011/0321007 | A1* | 12/2011 | Marum ..................... G06F 8/65 717/113 |
| 2013/0144566 | A1 | 6/2013 | De Biswas |
| 2014/0149882 | A1 | 5/2014 | Nysetvold et al. |
| 2014/0222387 | A1 | 8/2014 | Cannon et al. |
| 2014/0222758 | A1* | 8/2014 | March ................. G06F 17/3023 707/638 |
| 2014/0222919 | A1 | 8/2014 | Nysetvold et al. |
| 2014/0236550 | A1* | 8/2014 | Nysetvold ............... G06F 17/50 703/2 |

OTHER PUBLICATIONS

Draheim, D., & Pekacki, L. (Sep. 2003). Process-centric analytical processing of version control data. In Software Evolution, 2003. Proceedings. Sixth International Workshop on Principles of (pp. 131-136). IEEE.*
Gedye, David, and Randy H. Katz. "The design and implementation of a version server for computer-aided design data." Software: Practice and Experience 19.3 (1989), pp. 199-222.*
Bruegge, B., De Lucia, A., Fasano, F., & Tortora, G. (Oct. 2006). Supporting distributed software development with fine-grained artefact management. In Global Software Engineering, 2006. ICGSE'06. International Conference on, pp. 213-222. IEEE.*
Xu, Yue, A Flexible Context Architecture for a Multi-User GUI, Thesis, Dec. 2010, Department of Mechanical Engineering, Brigham Young University.
Red, Edward, David French, Ammon Hepworth, Greg Jensen, and Brett Stone, Multi-User Computer-Aided Design and Engineering Software Applications, Cloud-Based Design and Manufacturing (CBDM), Jan. 1, 2014, pp. 25-62, Springer International Publishing.
Red, Edward, Greg Jensen, Jordan Ryskamp, and Kenneth Mix, NXConnect: Multi-User CAx on a Commercial Engineering Software Application, Department of Mechanical Engineering, Brigham Young University. 2010 PACE Global Annual Forum.

* cited by examiner

*Primary Examiner* — Satish Rampuria
(74) *Attorney, Agent, or Firm* — Carlson, Gaskey & Olds, P.C.

(57) ABSTRACT

A system for collaborating on a component includes a computing device having a memory and a processor, the computing device configured to execute a first multi-user CAx environment, a data module configured to access data corresponding to a component design having at least one feature corresponding to a group of feature types from at least one current state database in a memory storage device, and a time stamp tool included in the multi-user CAx environment and configured to cause at least one computing device executing the multi-user CAx environment to apply a timestamp to each revision of a part model and save each revision including the timestamp to a revision database.

16 Claims, 3 Drawing Sheets

REVISION MANAGEMENT TOOLS FOR A MULTI-USER CAX ENVIRONMENT

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

In one exemplary embodiment a system for collaborating on a component includes a computing device including a memory and a processor, the computing device configured to execute a first multi-user CAx environment, a data module configured to access data corresponding to a component design including at least one feature corresponding to a group of feature types from at least one current state database in a memory storage device, and a time stamp tool included in the multi-user CAx environment and configured to cause at least one computing device executing the multi-user CAx environment to apply a timestamp to each revision of a part model and save each revision including the timestamp to a revision database.

In another exemplary embodiment of the above described system, the revision database is one of integral to the current state database and connected to the current state database via at least one of a direct connection and a network connection.

In another exemplary embodiment of any of the above described systems, the multi-user CAx environment further includes a history lookup module, and wherein the history lookup module is configured to receive a timestamp from a user and cause one of the multi-user CAx environment and the storage element to retrieve a saved revision having a timestamp approximately equal to the received timestamp from the revision database.

In another exemplary embodiment of any of the above described systems, the history lookup module is further configured to cause the multi-user CAx environment to revert changes having a timestamp after the received timestamp and provide a part model to at least one local computer, the provided part model representing the part model at the time of the timestamp.

In another exemplary embodiment of any of the above described systems, the timestamp approximately equal to the received timestamp is one of a revision timestamp nearest the received timestamp, a nearest revision timestamp prior to the received timestamp, and a nearest revision timestamp after the received timestamp.

Another exemplary embodiment of any of the above described systems further includes a forking module in the multi-user CAx environment, the forking module is configured to cause the multi-user CAx environment to create at least two parallel revision histories in the revision database and to create at least two parallel part models in the current state database.

In another exemplary embodiment of any of the above described systems, each of the parallel revision histories are joined as a shared revision history prior to a timestamp generated by the forking module.

Another exemplary embodiment of any of the above described systems further includes a database management module configured to cause at least one of a computational element in the storage system and a processor the computing device to consolidate revisions in a revisions database according to a pre-determined schedule.

In another exemplary embodiment of any of the above described systems, the database management module is contained within at least one of the computing device and a computational element in the storage system.

In another exemplary embodiment of any of the above described systems, the predetermined schedule consolidates all entries in the revisions database older than a given timestamp into a smaller number of entries at a predetermined period.

In another exemplary embodiment of any of the above described systems, the database management module is further configured to flag a revision entry as a milestone entry in response to receiving a milestone indication in the multi-user CAx environment.

An exemplary method for facilitating multiuser CAx operations includes receiving a revision to a part model from at least one client computer at a host computer, applying a timestamp to the revision using a timestamp module in a multi-user CAx environment, and the timestamp module causing the revision to be stored in a revision database, with each revision database entry including a state of the part model after the revision, the revision, and the timestamp.

Another example of the above described exemplary method further includes maintaining a history of each revision to the part model in the revision database, and retrieving a revision nearest a received timestamp in response to receiving a revision database query including a timestamp.

Another example of any of the above described exemplary methods includes retrieving the revision nearest the received timestamp comprises identifying a database entry in the revision database having a closest timestamp prior to the queried timestamp.

Another example of any of the above described exemplary methods includes retrieving the revision nearest the received timestamp comprises identifying a database entry in the revision database having a closest timestamp after to the queried timestamp.

Another example of any of the above described exemplary methods further includes creating at least two parallel part models within the revision database using a forking module in a multi-user CAx environment, wherein each of the at least two parallel part models includes a shared revision history prior to a timestamp corresponding to a fork command.

Another example of any of the above described exemplary methods further includes consolidating entries in the revision database according to a predetermined schedule using a database management module in at least one of a storage element storing the database and the multi-user CAx environment, wherein the consolidation comprises merging multiple revisions in a set period into a single revision entry including a state of the model at the end of the set period and a timestamp indicating the end of the set period.

In another example of any of the above described exemplary methods the consolidation maintains entries in the revision database flagged as milestones by the database management module.

Another example of any of the above described exemplary methods further includes flagging at least one entry in the revision database as a milestone entry using a database management module in one of the multi-user CAx environment and the storage element.

In one exemplary embodiment a multi-user CAx environment includes a host environment operating on a host computer, at least one local environment in communication with the host environment, wherein the at least one local environment is operated on a local computer distinct form the host computer, a timestamp tool within at least one of the host environment and the local environment, wherein the timestamp tool is configured to cause the CAx environment to apply a timestamp to each revision of a part model, and configured to cause the CAx environment to save each revision including the timestamp to a revision database in a storage system, and a history lookup module at least one of the at least one local environment and the host environment, wherein the history lookup module is configured to query the revision database and determine an entry in the revision database having a timestamp closest to a queried timestamp.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed embodiments will become apparent to those skilled in the art from the following detailed description. The drawings that accompany the detailed description can be briefly described as follows.

DETAILED DESCRIPTION

Figure 1:
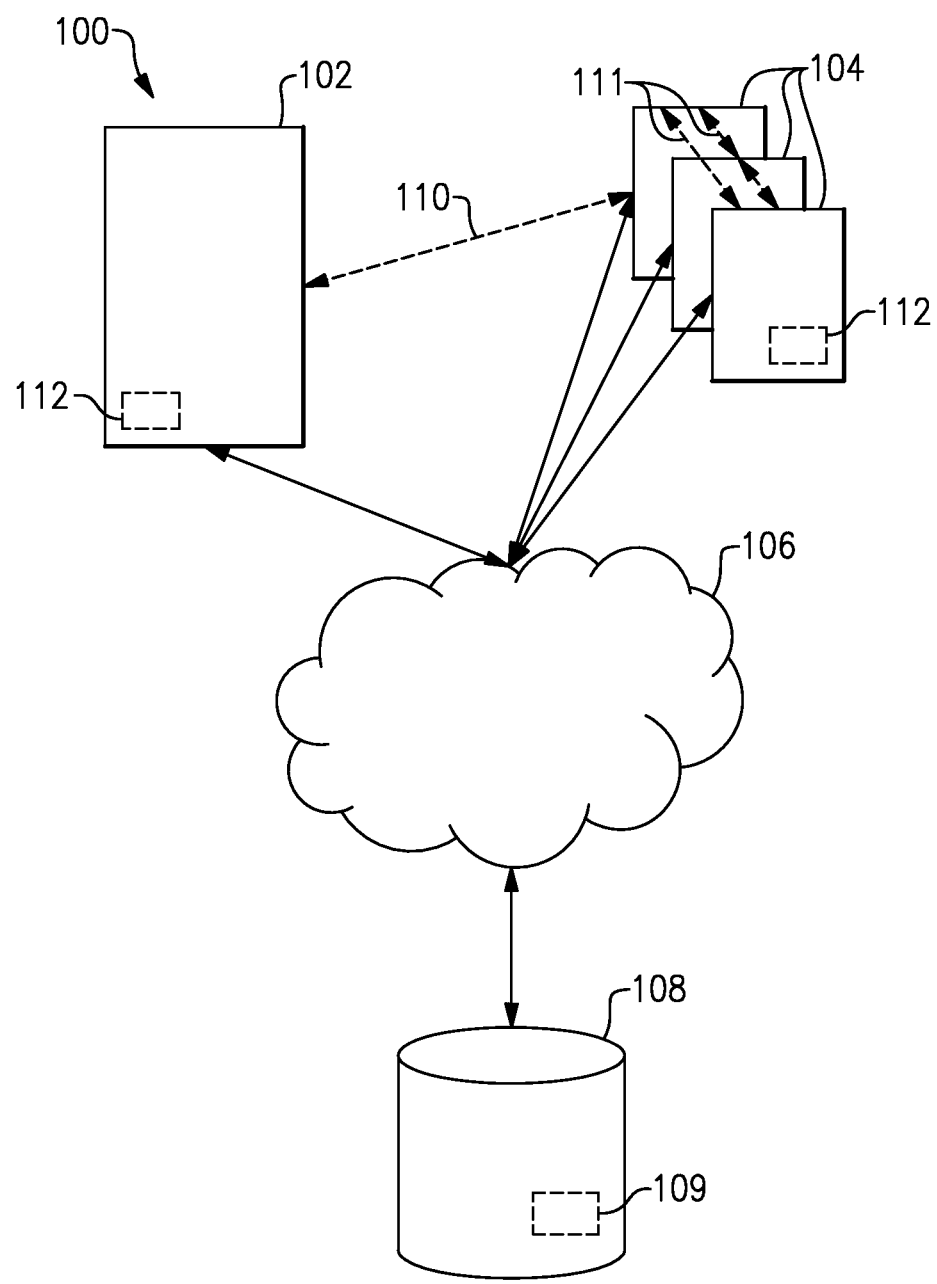
FIG. 1 illustrates a system for a multi-user CAx environment, according to an embodiment.

FIG. 1 illustrates a computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In some embodiments, the database 109 is linked or otherwise corresponds to multiple part files or multiple instances of one part file. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, a relative or absolute spatial position or orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one custom layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to make modifications to various aspects of a component design corresponding to one or more part files. In some embodiments, the part file is stored locally at the storage system 108, with local copies of the part file at the client computers 104 being synchronized periodically. Modifications to each part file are communicated to each CAx environment currently accessing the part file, either in real-time or periodically utilizing a synchronization scheme. Display or visualization of the modification is therefore made substantially immediately available in CAx environments accessing the same part file, which can assist the multiple users in identifying conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for example. Accordingly, it may be desirable to limit the visualization of a particular aspect of a component design depending on the level(s) of access provided to a particular user profile. Each user profile corresponds to one or more access lists setting the level(s) of access for each user profile.

Figure 2A:
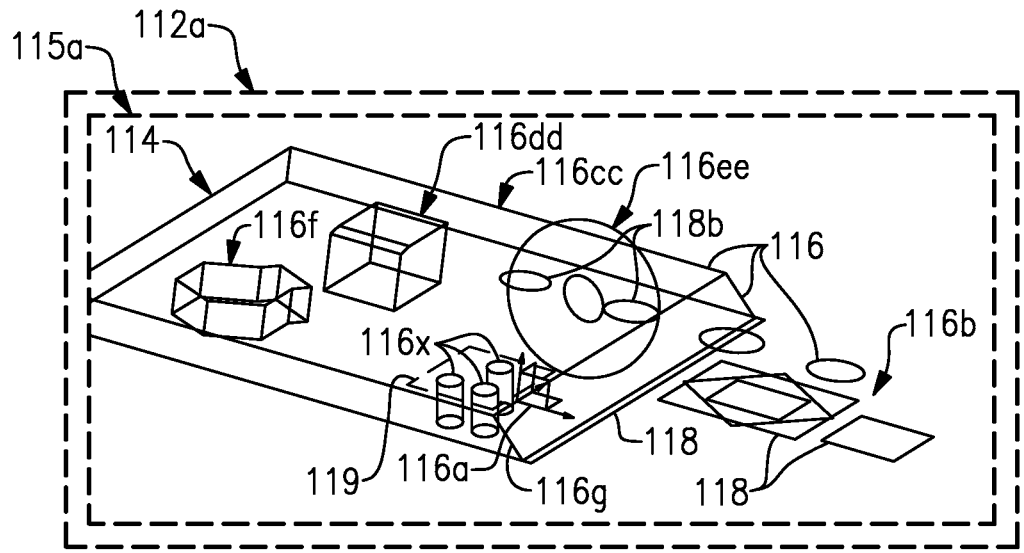
FIG. 2A illustrates a sample component design displayed in a first CAx environment, according to an embodiment.
Figure 2B:
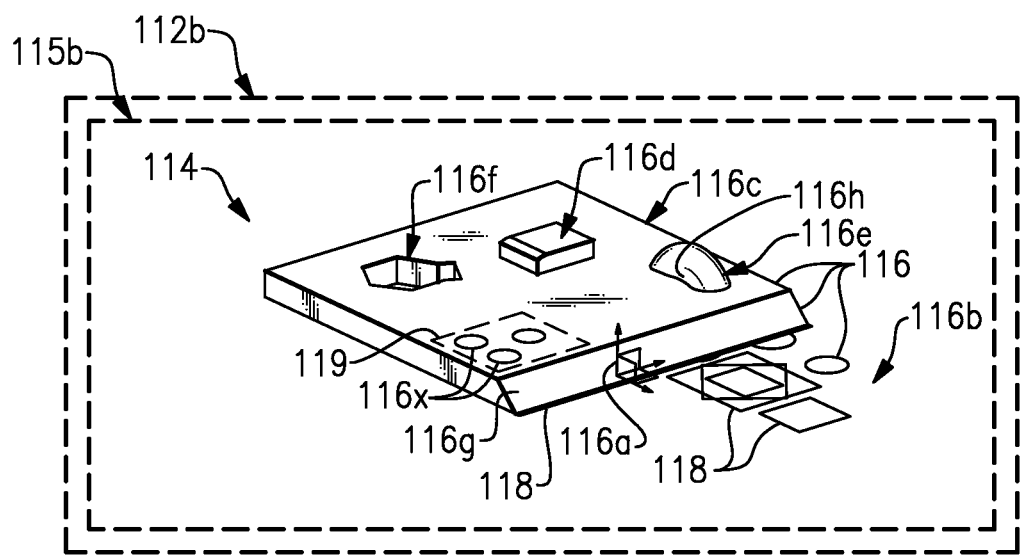
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The example component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c.

Non-geometric features include surface shading 116*h* (shown in FIG. 2B) applied to the rotate 116*e* feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112*a*, 112*b*. As illustrated by the CAx environment 112*a* in FIG. 2A, the user has selected one or more visualization settings to show the wireframe geometries 116*cc*, 116*dd*, 116*ee* and to hide the corresponding solid features 116*c*, 116*d*, 116*e*. In the CAx environment 112*b* shown in FIG. 2B, the user has selected one or more visualization settings to show solid features 116*c*, 116*d*, 116*e* and to hide wireframes 116*c*, 116*d*, 116*f*, for example. The visualization settings of each CAx environment 112 can be customized according to the needs of a particular situation even though each of the users is working on the same component design 114.

During the course of editing and working on any given part file in the multi-user CAx system 100 of FIG. 1, models and instances of the part file are saved to the database 109 periodically. While each instance saved to the database reflects a snapshot of the current model, intermediate steps between the previous model and the current model are lost. In order for an engineer or designer to determine the intermediate steps utilized to transition from the previous model to a current model, the engineer or designer must use their intuition and fill in the gaps based on their understanding of typical design or engineering procedures. Further, when conflicts between model assemblies are detected, it is difficult to determine the evolution of the model and difficult to resolve the conflicts. It may also be necessary, as the nature of iterative design requires, to return to concepts prior to more recent evolutions. The engineer or designer must then recreate geometry based on images and memory as the previous state no longer exists.

Figure 3:
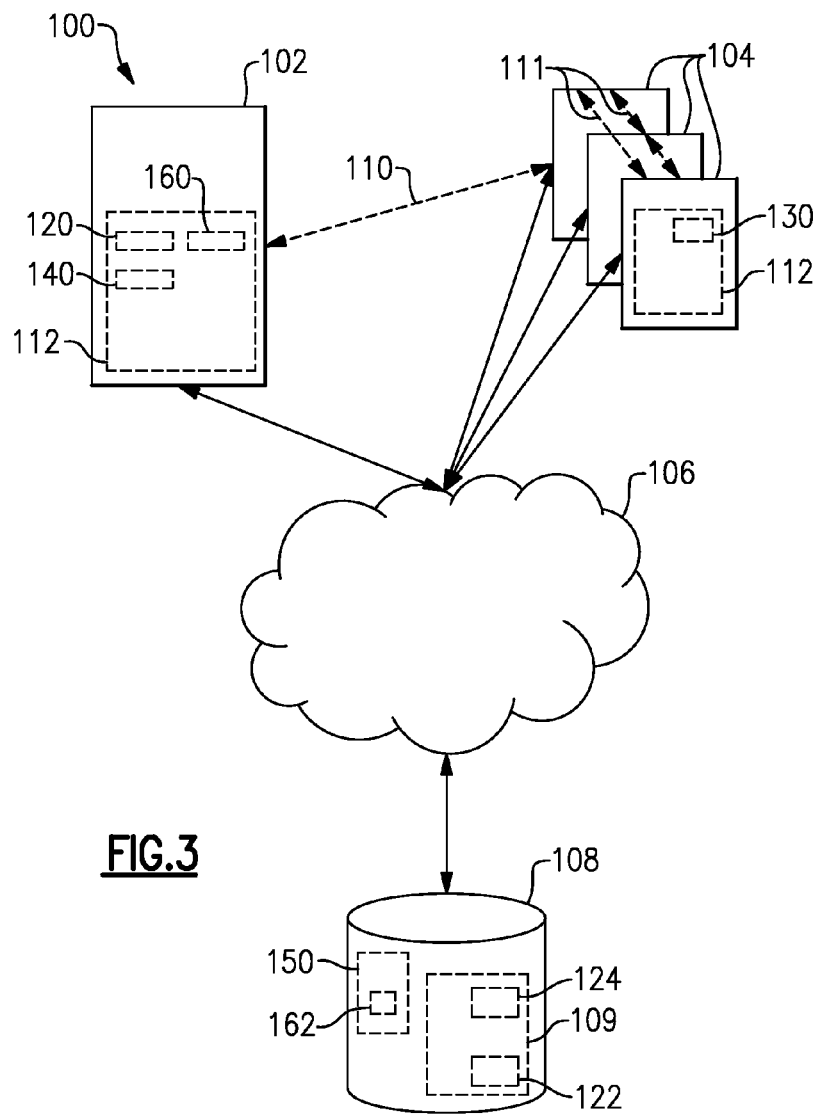
FIG. 3 illustrates a more detailed embodiment of the system for a multi-user CAx environment of FIG. 1.

With continued reference to FIGS. 1, 2*a*, and 2*b*, and with like numerals indicating like elements, FIG. 3 illustrates a more detailed embodiment of the system for a multi-user CAx environment of FIG. 1.

As described above, each part file includes multiple features, and each feature is represented by a data set with one or more parameters or attributes. During the course of design, features are revised or manipulated by the client computers 104, resulting in an alteration to the data set representing the feature. Included in the alteration to the data set is a timestamp indicating the date and time when the feature modification occurred. In the embodiment of FIG. 3, a revisions database 122 stores each modification, along with the user information for the user who made the change, and the associated timestamp, thereby allowing a user at a client computer 104 to recreate the part file at any given point in time.

To facilitate this feature, the multi-user CAx environment 112 operating on the host computer 102 includes a timestamp tool 120. The timestamp tool 120 applies a timestamp to each revision, edit, or other manipulation to the features as the revision is received from one or more of the client computers 104. In some embodiments, the timestamp is a date. In other embodiments, the timestamp can be a more precise time including date, hour, minute, second, and/or fraction thereof of the manipulation of the feature.

The timestamp tool 120 stores data describing the details of the manipulation in the revision database 122 within the database 109 along with the corresponding timestamp. The revision database 122 includes a record of each revision or manipulation to the part, including the timestamp information of each revision and the current state of the part after manipulation. Stored independently within the database 109 is a current state of the part 124. The current state of the part 124 reflects only the most recent state of the part and does not reflect any previous revisions, manipulations or sequencing of revisions and manipulations.

The databases 122, 124 are maintained and managed by a database management module 160, 162. In some embodiments, the database management module 162 is contained within a computational element 150 of one or more of the data storage elements 108. In alternative embodiments, the database management module 160 is a software module within the multi-user CAx environment 112 of the host computer 102.

In either case, the database management module 160, 162 ensures that the revision database 122 does not become unwieldy, or excessively sized. Storing every edit or manipulation over the lifecycle of a part in a single database can result in an extreme size of the database 122. In order to prevent size bloat in the revision database 122, the database management module 160, 162 can access and edit the revision database 122 through the internet 106, other network, or through a direct connection.

In some embodiments, the database management module 160, 162 removes revision or edit entries from the revision database 122 according to a predetermined schedule in order to reduce the size of the database 122. By way of example, in one embodiment, the database management module 160, 162 determines which database entries are older than one week old and combines all entries for each day older than one week into a single consolidated revision entry indicating the state of the part model at the end of that day. The database management module 160, 162 can further consolidate entries older than three months into a single entry at the end of each month, indicating the state of the part model at the end of that month. The particular time periods described herein are exemplary in nature, and can be calibrated or altered depending on the frequency that a given part is revised or to account for any other factor.

Embodiments utilizing consolidation from a database management module 160, 162 require the designer, or other user of the CAx system, accessing the revision database 122 at a later date to infer or otherwise determine some revisions that occurred between each consolidated entry, but reduces the amount of inference required relative to a system storing only milestones.

In alternate embodiments, the database management modules 160, 162 can consolidate the size by segregating portions of the revisions database 122 into different sub-databases across multiple distributed storage elements 108, and maintain an index file identifying which distributed storage element contains which portion of the revision database 122. By way of example, in one embodiment, all revisions older than three months are stored in an old revisions sub-database, and the index file directs queries older than three months to the old revisions sub-database.

In yet a further embodiment, the database management modules 160, 162 can include a milestone marking process. The milestone marking process allows the database management module 160, 162 to receive an indication from the host computer 102, from one or more of the client computers 104, or from both, indicating that a current instance of the part model is a milestone, and should be maintained within the revision database 122. The flagging of a particular revision as a milestone overrides the inbuilt consolidation functions of the database management module 160, 162 and prevents the flagged revision from being consolidated.

In yet further embodiments, the multi-user CAx environment 112 of the host computer 102 includes a forking module 140. The forking module 140 operates in conjunction with the database management module 160, 162 to begin two or more new revision history databases pointing back to a shared revision database 122 at a single point in time. The forking module 140 provides this forking function upon receipt of a fork command from one or more of the client computers 104. In some embodiments, the forking module 140 can further maintain a model history tree either in a memory of the host computer 102, or as another database or other data storage element, within the storage system 108.

Further included within each of the local CAx environments 112 is a model revision lookup module 130. The model revision lookup module 130 provides an interface allowing a user operating in a CAx environment on one of the client computers 104 to input a date or time that the user wishes to review the model. The model revision lookup module 130 then connects with the data storage system 108 either directly, over the network 106, or through the host computer 102, and queries the revision database 122 for the saved revision having a timestamp nearest to the queried date and time.

In some alternate embodiments, the model revision lookup module 130 is configured to find the nearest revision entry having a timestamp prior to the queried date and time. In further alternate embodiments, the model revision lookup module 130 is configured to find the nearest revision entry having a timestamp after the queried date and time. The query can be in the form of any standard database query, or in a proprietary query format defined within one or more of the database 109, the history lookup module 130, and the CAx environment 112.

Once a revision entry in the revision database 122 has been identified by the model revision lookup module 130, the model revision lookup module 130 reverts the actions performed on the part model after the selected revision entry and displays the part as it existed at the time of the selected revision. In some embodiments, the model revision lookup module 130 can integrate with the forking module 140 and save the viewed part as a new model with a branch point at the time of the retrieved revision. In further embodiments, the model revision lookup module 130 can allow the user to set the viewed revision as the current model, overwriting any subsequent revisions. In yet further embodiments, the model revision lookup module 130 can allow the user to revert the part model back to its state prior to the access by the history lookup module 130.

Figure 4:
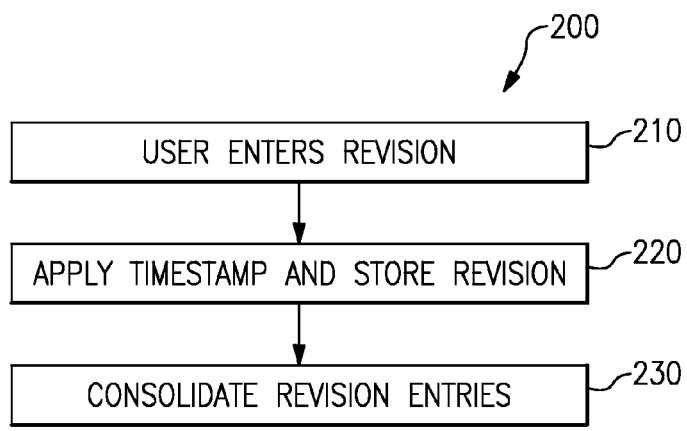
FIG. 4 illustrates a flowchart indicating a revision process utilized by the embodiment of FIG. 3.

With continued reference to FIG. 3, and with like numerals indicating like elements, FIG. 4 illustrates a flowchart 200 indicating a revision process utilized by the embodiment of FIG. 3. Initially, a user at one of the client computers 104 enters a revision or a manipulation to the part model being worked on in the CAx environment 112 at a "user enters revision" block 210. The client computer 104 then transmits the revision to the host computer 102, where the multi-user CAx environment 112 on the host computer applies the revision to the part model.

Upon receipt of the revision at the host computer 102, the timestamp tool 120 applies a timestamp to the revision and stores the revision in the revision database 122 at a "apply timestamp and store revision" block 220. In this manner, the timestamp tool 120 maintains a full record of each revision and the time which the revision occurred in the revision database 122. In order to prevent the revision database 122 from becoming excessively large, the database management module 160, 162 periodically consolidates the entries in the revisions database 122 according to the above described consolidation schedule at a "consolidate revision entries" block 230. As described above, the consolidation does not include any revisions marked as a milestone revision by the database management module 160, 162.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for collaborating on a component, comprising:
   a computing device including a memory and a processor, the computing device configured to execute a first multi-user Computer-Aided Technologies (CAx) environment;
   a data module configured to access data corresponding to a component design including at least one feature corresponding to a group of feature types from at least one current state database in a memory storage device;
   a time stamp tool included in said multi-user CAx environment and configured to cause at least one computing device executing the multi-user CAx environment to apply a timestamp to each revision of a part model and save each revision including said timestamp to a revision database;
   a history lookup module, the history lookup module configured to receive a timestamp from a user and cause one of the multi-user CAx environment and the storage element to retrieve a saved revision having a timestamp approximately equal to the received timestamp from said revision database; and
   a forking module in said multi-user CAx environment, the forking module configured to cause the multi-user CAx environment to create at least two parallel revision histories in the revision database and to create at least two parallel part models in the current state database.

2. The system of claim 1, wherein the revision database is one of integral to the current state database and connected to the current state database via at least one of a direct connection and a network connection.

3. The system of claim 1, wherein the history lookup module is further configured to cause said multi-user CAx environment to revert changes having a timestamp after the received timestamp and provide a part model to at least one local computer, the provided part model representing the part model at the time of the timestamp.

4. The system of claim 1, wherein the timestamp approximately equal to the received timestamp is one of a revision timestamp nearest the received timestamp, a nearest revision timestamp prior to the received timestamp, and a nearest revision timestamp after the received timestamp.

5. The system of claim 1, wherein each of the parallel revision histories are joined as a shared revision history prior to a timestamp generated by the forking module.

6. The system of claim 1, further comprising a database management module configured to cause at least one of a computational element in the storage system and a processor the computing device to consolidate revisions in a revisions database according to a pre-determined schedule.

7. The system of claim 6, wherein the database management module is contained within at least one of said computing device and a computational element in said storage system.

8. The system of claim 6, wherein the predetermined schedule consolidates all entries in said revisions database older than a given timestamp into a smaller number of entries at a predetermined period.

9. The system of claim 6, wherein the database management module is further configured to flag a revision entry as a milestone entry in response to receiving a milestone indication in said multi-user CAx environment.

10. A method for facilitating multiuser Computer-Aided Technologies (CAx) operations comprising:
   receiving a revision to a part model from at least one client computer at a host computer;
   applying a timestamp to said revision using a timestamp module in a multi-user CAx environment;
   the timestamp module causing said revision to be stored in a revision database, with each revision database entry including a state of the part model after the revision, the revision, and the timestamp;
   retrieving a revision nearest a received timestamp in response to receiving a revision database query including a timestamp using a history lookup module by at least identifying a database entry in said revision database having a closest timestamp after to the queried timestamp, wherein retrieving the revision nearest a received timestamp comprises reverting changes to said part model that occurred after said timestamp; and
   creating at least two parallel part models within said revision database using a forking module in a multi-user CAx environment, wherein each of said at least two parallel part models includes a shared revision history prior to a timestamp corresponding to a fork command.

11. The method of claim 10, further comprising maintaining a history of each revision to the part model in said revision database.

12. The method of claim 11, wherein retrieving the revision nearest the received timestamp comprises identifying a database entry in said revision database having a closest timestamp prior to the queried timestamp.

13. The method of claim 10, further comprising consolidating entries in said revision database according to a predetermined schedule using a database management module in at least one of a storage element storing said database and the multi-user CAx environment, wherein said consolidation comprises merging multiple revisions in a set period into a single revision entry including a state of the model at the end of the set period and a timestamp indicating the end of the set period.

14. The method of claim 13, wherein said consolidation maintains entries in said revision database flagged as milestones by the database management module.

15. The method of claim 10, further comprising flagging at least one entry in said revision database as a milestone entry using a database management module in one of said multi-user CAx environment and said storage element.

16. A multi-user Computer Aided Technologies (CAx) environment comprising:
   a host environment operating on a host computer;
   at least one local environment in communication with the host environment, wherein the at least one local environment is operated on a local computer distinct form said host computer;
   a timestamp tool within at least one of said host environment and said local environment, wherein the timestamp tool is configured to cause said CAx environment to apply a timestamp to each revision of a part model, and configured to cause the CAx environment to save each revision including said timestamp to a revision database in a storage system;
   a history lookup module at least one of said at least one local environment and said host environment, wherein said history lookup module is configured to query said revision database and determine an entry in said revision database having a timestamp closest to a queried timestamp;
   wherein the history lookup module is configured to cause said multi-user CAx environment to revert changes having a timestamp after the received timestamp and provide a part model to at least one local computer, the provided part model representing the part model at the time of the timestamp; and
   a forking module in said multi-user CAx environment, the forking module configured to cause the multi-user CAx environment to create at least two parallel revision histories in the revision database and to create at least two parallel part models in the current state database.

* * * * *